Patented May 18, 1948

2,441,826

UNITED STATES PATENT OFFICE 2,441,826

LIQUID COMPOSITIONS FOR CURING CONCRETE

Ralph E. Madison, Detroit, Mich., assignor to Truscon Laboratories, Inc., Detroit, Mich., a corporation of Michigan No Drawing. Application November 8, 1946, Serial No. 708,797

5 Claims. (Cl. 260—27)

This invention relates to improvements in liquid compositions for curing freshly placed Portland cement concrete.

This application is a continuation-in-part of my copending application Serial No. 547,097, which was filed July 28, 1944.

It is well known in the art that certain film forming compositions can be applied to the surfaces of freshly placed concrete and prevent or hinder the evaporation of the original mixing water. In other words, the compositions will cause most of the water to be retained in the mass for the necessary purpose of hydration of the cement. Older and more expensive methods of curing, such as sprinkling, ponding, covering with wet earth or burlap or cotton mats, etc., are thereby eliminated. Some of the older curing compositions are disclosed in U. S. patents to Hayden, No. 1,684,671 and Rowan, No. 1,867,421, those in the first patent being characterized by being black in color and those in the second patent being characterized by being clear or transparent. Later compositions are disclosed in U. S. Patents No. 2,344,579 and No. 2,344,578 to Whitesides, the first referring to black compositions and the second referring to clear or transparent compositions.

The present invention relates to the clear or transparent types. In connection therewith it has been discovered that certain cheap and plentiful resinous materials can be used to make compositions having very good water-retaining properties particularly under the extreme atmospheric conditions encountered in the laying of concrete roads during the hot summer months. Considered in its broader aspects, the compositions comprise solutions of a low viscosity resin polymer and rosin or a metallic derivative of rosin in a suitable hydrocarbon solvent.

In particular, the resin polymer may be selected from the class consisting of petroleum hydrocarbon resins of the type which normally exists as a hard, brittle mass, and are produced by the cracking and repolymerization of selected petroleum distillates, terpene resins made by polymerization of beta-pinene, an alicyclic olefin, and known in the trade as Terpene resin or Piccolyte, and coumarone-indene resins made by polymerization of coumarone-indene, a mixture of aromatic-type olefins, and known in the trade as Cumar. The term "petroleum resin" as used herein is to be understood to be the petroleum hydrocarbon resin defined above. The melting points of the resins employed are approximately 100°–120° C.

These resins are characterized by being practically unsaponifiable, the saponification number rarely exceeding 5. These resins are further characterized by producing solutions of low viscosity, this latter quality rarely being in excess of thirteen seconds in a No. 4 Ford viscosity cup, when determined on a 40% solution of the resin. It will be noted that all of the above resins are polymers of various hydrocarbon olefins resulting in hard, brittle masses as contrasted to the plastic or elastic bodies that can be made from the same type of olefin under different conditions and, therefore, may be broadly referred to as hard resins of the olefin type.

The petroleum hydrocarbon resin manufactured and sold by the Velsicol Corporation and identified by the manufacturer as "Velsicol AB 11–8" is a typical petroleum resin coming within the scope of this invention. This particular petroleum resin and other resins of this type having similar physical and chemical properties are pre-eminently suited for use in compositions for curing concrete, and tests have demonstrated that compositions containing them have unexpectedly good water retaining properties. "Velsicol AB 11–8" is a methylated indene-methylated styrene type resin which normally exists as a hard, brittle mass and forms solutions of low viscosity, melting at approximately 100°–120° C., and having a molecular weight in the range of 500–2000, said resin having been produced by the cracking and repolymerization of selected petroleum distillates.

The rosin may be from the class of wood or gum rosins. It may be a physically treated rosin as in U. S. Patent No. 1,643,276 to Logan and known in the trade as Solros, or a chemically treated rosin known as "Poly Pale Rosin." Further it may be a calcium or zinc salt of the rosins mentioned before.

The calcium rosinate may be a compound known in the art as "limed rosin," made by slowly adding approximately 5% of lime to rosin maintained in a molten condition at approximately 500° F., and allowing the reaction to proceed until most of the foaming has subsided. This material will have an acid number of approximately 96.

The zinc rosinate may be produced by refluxing a solution of rosin in the presence of zinc oxide until the latter is reacted. One commercial variety of zinc rosinate employs enough zinc oxide to produce an acid number of approximately 15. Another variety uses an excess of zinc oxide in which case the acid number is zero or actually less, the material thus being on the alkaline side.

As stated before, the various nonmetallic rosins have been used with an acid number ranging from approximately 145 to 175, limed rosins with an acid number approximately 96, and the various zinc treated rosins with an acid number ranging from 15 to less than zero. It is to be understood that for the purposes of this invention these materials are equivalents. Solutions of all of these rosins and metallic derivatives have been used in combination with solutions of the three resins disclosed and it has been found that, under the same conditions of testing, practically equal water retention qualities are obtained. The reasons for selecting a particular material will arise from considerations of availability, cost, color, viscosity, drying time, etc. For instance, the physically treated rosins comprise some dark colored materials, which, however, are quite cheap. The chemically treated rosins usually are lighter in color and also have a higher melting point which is an aid in rapid drying to a solid film, but these rosins are relatively high in cost. Limed rosin can be either light or dark, has a fairly high melting point, and is widely available. The zinc rosins are widely available, are light in color and, as in the case of limed rosin, produce solutions of rather high viscosity. This latter property is desirable when the curing compound is to be used on a vertical or steeply inclined surface, the high viscosity materially tending to prevent the compound from flowing or running off the surface.

Any suitable hydrocarbon solvent may be used. Typical examples are petroleum or coal tar solvents or combinations thereof selected from the group V. M. P. naphtha—distillation 200°–300° F., mineral spirits—distillation 290°–410° F., toluene, xylene, etc. The preferred solvent or combination is that which will have a distillation range of approximately 200°–300° F., although it is not limited to this range.

The invention relates to the specific discovery that when certain amounts of solutions of the rosins or metallic rosin derivatives are added to solutions of the particular resins hereinabove described, the water-retaining properties are very considerably greater than when either the rosin or metallic rosin derivatives, or the resins, are used alone. At the present time it is not fully comprehended why the addition of these elements to solutions of the three classes of resins disclosed, has such a signal effect on the water retention qualities. It is well known that freshly placed concrete is alkaline and that rosin and its metallic derivatives are chemically affected by alkali. A plausible theory is that the alkali in the fresh concrete does react to a certain extent with the rosin or metallic derivative to produce a certain number of "anchor points" which act to hold the deposited film smoothly in place. This view is supported by the fact that if solutions of the resins alone, or of the rosins or metallic derivatives alone are applied in the normal manner to surfaces of freshly placed concrete, there usually will result a considerable amount of cracking or "curling up" of the deposited films. Since smooth films are obtained when the combinations are used, it is indicated that a certain amount of anchoring is taking place. While it is not desired that the invention be limited by this explanation, it nevertheless seems to be adequate. In other words, with a resin solution alone there are no forces present to prevent the resin from cracking and curling up when the solvent has evaporated. And with the solutions of rosin or metallic rosin derivatives alone, there seems to be so much chemical reaction taking place that all film-forming properties have been destroyed.

It should be pointed out also that the common element in all the rosins and metallic derivatives of the rosins used is abietic acid, whether in its natural form, its isomeric forms, or its polymerized forms; or whether in the metallic derivatives of abietic acid in its natural form, its isomeric forms or its polymerized forms. Further by way of contrast, it has been determined that the glycerine esters of abietic acid when used in the invention do not produce the same beneficial effect. Since these latter materials are but very slightly affected by the alkaline elements of concrete and do not produce beneficial results, it would appear that the limited amount of reaction product of the alkaline elements of concrete and abietic acid, or the metallic derivatives of abietic acid, is in some way responsible for the unexpected results.

One embodiment of the invention is 32 pounds of petroleum resin, 8 pounds of physically treated wood rosin and 50 pounds of V. M. P. naphtha and 10 pounds of xylene. Still another example is 32 pounds of petroleum resin, 8 pounds of zinc rosinate, 50 pounds of V. M. P. naphtha and 10 pounds of xylene. The same examples may be used in which terpene resin is substituted for petroleum resin. The same examples may also be used in which coumarone-indene resin is substituted for petroleum resin and in which 20 parts of xylene are used with 40 parts of naphtha for better solvency.

It is pointed out that any suitable combinations of the resins and rosins or rosin derivatives may be used; the optimum quantities being approximately 32 pounds of combined resin, approximately 8 pounds of combined rosins or metallic rosin derivatives, and approximately 60 pounds of solvent, selected to provide the solvency required by the resins employed and having a distillation range of approximately 200°–300° F.

The amount of resin in the non-volatile part of the composition may be varied between approximately 32 and 24 pounds and the rosin or metallic rosin derivatives between 8 and 16 pounds. Further the combined amount of resin and rosin or metallic rosin derivative may be varied between approximately 35 to 57 pounds and the solvent between 65 and 43 pounds. When the combined resin and rosin or metallic rosin derivative exceeds approximately 57 pounds the viscosity will have a tendency to rise to such an extent that the material will be difficult to apply by spraying methods. When the combined resin and rosin is less than approximately 25 pounds the viscosity tends to become so low that excessive penetration into the surface layers of the concrete will occur, thus producing a somewhat discontinuous film with greatly reduced water-retaining properties.

Having thus shown several examples of the compositions which may embody the invention, a table is hereinafter set out giving results of water retention tests expressed in grams of water loss at the end of seven days. The tests were made under a well-known variation of A. S. T. M. Designation C156–40T, "Method for Determining the Efficiency of Concrete Curing Materials" as outlined below. It is presently held by those versed in the art that a satisfactory curing compound should not lose more than 5.0 grams of water under this test.

*Procedure.*—Small test molds shall be filled with mortar and treated with curing compound and the water loss due to evaporation through the curing compound shall be determined at one and seven days. Details of testing procedure follow:

(a) *Composition of mortar.*—6 pounds sand, 2 pounds cement, and sufficient water to produce 50% flow.

The sand shall be dry and graded in accordance with A. S. T. M. Designation: C156–40T. The cement shall be normal Portland. The flow shall be measured in accordance with A. S. T. M. Designation: C–87.

(b) *Molds.*—The molds shall be small pie pans approximately 6 inches in diameter and ⅞ inch deep. The weights shall be recorded prior to filling with mortar.

(c) *Mixing.*—Sand and cement shall be mixed dry till uniform and then water as predetermined for 50% flow shall be added and ingredients mixed by hand for 1½ minutes, using rubber gloves. The quantity of material shall be sufficient to yield 20% more material than necessary to fill six molds. No more than six pans shall be filled from any one mix.

(d) *Molding.*—The molds shall be filled, tamped, and wood floated to a uniform surface level with the rim except for a shallow trench along the rim. The rim shall then be wiped clean and the specimen weighed.

(e) *Preliminary storage.*—Store specimens in a cabinet maintained at 100° F., plus or minus 1° and 30% relative humidity, plus or minus 3% for 60 to 90 minutes.

(f) *Preparation of surface.*—Remove specimens from preliminary storage cabinet. Brush surface lightly to remove laitance and wipe rims clean again. Immediately return specimens to cabinet.

(g) *Application of compound.*—After an additional 30 minutes in the cabinet, specimens shall be removed and weighed and the trench filled with sealing compound to form a bead slightly above the surface of the pan. The sealed specimen shall again be weighed and the curing compound applied immediately at a rate of 200 square feet per gallon, using a nasal sprayer. The procedure outlined above is such that the surface water sheen has disappeared and no cracks have formed at the edge of the specimen.

(h) *Spray procedure.*—Fill the spray jar approximately two-thirds full with curing compound. Attach the spray tubes and tip and weigh on a laboratory scale. (Adjust tip so that it is perpendicular to spray tubes.) Calculate the number of grams necessary to cover the pan and rim of the molded specimen at a rate of 200 square feet per gallon. Attach sprayer to a suitable compressed air supply, using approximately six pounds air pressure per square inch and spray curing compound evenly onto the surface. Detach the air line at intervals and weigh the spray gun and contents. Spraying should be continued until the calculated weight has been applied to the surface. The weight of solid material on each specimen is determined by spraying the same quantity as used on the mortar specimens onto empty pans weighed for tare and placed in the cabinet with the mortar specimens and re-weighed at twenty-four hours.

(i) *Storage of specimens.*—Immediately after application the specimens are placed in a cabinet maintained at 100° F., plus or minus 1° and relative humidity of 30%, plus or minus 3%.

The relative humidity can be maintained by filling humidity control pan with saturated magnesium chloride solution. The pan should be painted with a coal-tar paint to prevent reaction between the magnesium chloride and the zinc coating on the pan.

Periodic checks should be made on the relative humidity by means other than the wet and dry bulb thermometers supplied with the cabinet. For example, a motor driven hygrometer may be operated for a few minutes inside the cabinet, but not long enough to raise the humidity due to water evaporation from the hygrometer itself. Further control, if necessary, can be obtained by using calcium chloride. Means must be provided to prevent the calcium chloride solution formed from mixing with the magnesium chloride solution.

(j) *Calculation of water retention.*—Weigh pans at stated intervals. Loss of water is calculated on the amount of water in the mortar at time of application of curing compound.

The compositions of the materials listed in Table I below show the preferred embodiments of the invention. The variations and limits from a standpoint of water retention are shown in further tables. "Velsicol AB 11–8" was employed in all of the tests where a petroleum resin was used inasmuch as it is representative of the hard-type petroleum resins coming within the scope of this invention.

TABLE I

*Compositions of preferred materials*

| No. | Type of Resin | Pounds Resin | Type of Rosin or Derivative | Pounds of Rosin or Derivative | Type of Solvent | Lbs. of Solvent | Grams of Water Loss |
|---|---|---|---|---|---|---|---|
| 1 | Petroleum | 32 | Physically treated rosin | 8 | V. M. P. Naphtha / Xylene | 50 / 10 | 3.3 |
| 2 | do | 32 | 5% limed rosin | 8 | V. M. P. Naphtha / Xylene | 50 / 10 | 3.2 |
| 3 | do | 32 | Zinc rosinate | 8 | V. M. P. Naphtha / Xylene | 50 / 10 | 4.7 |
| 4 | do | 32 | Chemically treated rosin | 8 | V. M. P. Naphtha / Xylene | 50 / 10 | 3.5 |
| 5 | Terpene | 32 | Physically treated rosin | 8 | V. M. P. Naphtha | 60 | 3.1 |
| 6 | do | 32 | 5% limed rosin | 8 | do | 60 | 3.2 |
| 7 | do | 32 | Zinc Rosinate Acid No. 15 | 8 | do | 60 | 1.9 |
| 8 | do | 32 | Chemically treated rosin | 8 | do | 60 | 2.3 |
| 9 | Coumarone-Indene | 32 | Physically treated rosin | 8 | V. M. P. Naphtha / Xylene | 40 / 20 | 4.9 |
| 10 | do | 32 | 5% limed rosin | 8 | V. M. P. Naphtha / Xylene | 40 / 20 | 4.8 |
| 11 | do | 32 | Zinc Rosinate Acid No. 15 | 8 | V. M. P. Naphtha / Xylene | 40 / 20 | 5.0 |
| 12 | do | 32 | Chemically treated rosin | 8 | V. M. P. Naphtha / Xylene | 40 / 20 | 3.4 |

TABLE II

*Compositions using resins alone, and rosins or metallic rosinates alone*

| No. | Type of Resin | Pounds Resin | Type of Rosin or Derivative | Pounds of Rosin or Derivative | Type of Solvent | Lbs. of Solvent | Grams of Water Loss |
|---|---|---|---|---|---|---|---|
| 13 | Petroleum | 40 | | 0 | V. M. P. Naphtha / Xylene | 50 / 10 | 8.75 |
| 14 | Coumarone-Indene | 40 | | 0 | V. M. P. Naphtha / Xylene | 40 / 20 | 12.20 |
| 15 | Terpene | 40 | | 0 | V. M. P. Naphtha | 60 | 7.75 |
| 16 | | 0 | Chemically treated rosin | 40 | do | 60 | 20.6 |
| 17 | | 0 | Physically treated rosin | 40 | do | 60 | 18.7 |
| 18 | | 0 | Gum Rosin | 40 | do | 60 | 25.1 |
| 19 | | 0 | 5% limed rosin acid No. 96 | 40 | do | 60 | 16.5 |
| 20 | | 0 | Zinc rosinate acid No. 15 | 40 | do | 60 | 25.5 |
| 21 | | 0 | Zinc rosinate acid No. 0 (minus) | 40 | do | 60 | 40.8 |

TABLE III

*Table showing limiting compositions*

| No. | Type of Resin | Pounds Resin | Type of Rosin or Derivative | Pounds of Rosin or Derivative | Type of Solvent | Lbs. of Solvent | Grams of Water Loss |
|---|---|---|---|---|---|---|---|
| 22 | Petroleum | 36 | Physically treated rosin | 4 | V. M. P. Naphtha / Xylene | 50 / 10 | 6.3 |
| 1 | do | 32 | do | 8 | V. M. P. Naphtha / Xylene | 50 / 10 | 3.3 |
| 23 | do | 28 | do | 12 | V. M. P. Naphtha / Xylene | 50 / 10 | 3.5 |
| 24 | do | 24 | do | 16 | V. M. P. Naphtha / Xylene | 50 / 10 | 4.7 |
| 25 | do | 20 | do | 20 | V. M. P. Naphtha / Xylene | 50 / 10 | 5.4 |
| 26 | do | 16 | do | 24 | V. M. P. Naphtha / Xylene | 50 / 10 | 6.9 |
| 27 | do | 45.6 | do | 11.4 | V. M. P. Naphtha / Xylene | 35 / 7 | 3.1 |
| 1 | do | 32 | do | 8 | V. M. P. Naphtha / Xylene | 50 / 10 | 3.3 |
| 28 | do | 28 | do | 7 | V. M. P. Naphtha / Xylene | 54 / 11 | 4.6 |
| 29 | do | 20 | do | 5 | V. M. P. Naphtha / Xylene | 62 / 13 | 8.2 |

In order to demonstrate the critical nature of those petroleum resins which are operative in the present invention, comparative tests were made using "Velsicol AB 11–8" and another type of petroleum resin which is produced by polymerization of unrefined vapor phase cracked gasoline, normally exists as a thick, viscous resinous material and has different physical and chemical properties which render it entirely unsuited for the present invention. The particular petroleum resin known to the trade as "Phillips Drying Oil, Grade I" was selected for purposes of comparison since it appears to be representative of the normally viscous petroleum resins. The specifications of "Phillips Drying Oil, Grade I" appear in Table IV below:

TABLE IV

Gravity, °API _____ 16.2
A. S. T. M. Distillation:
    I. B. P., °F _____ 222
    5% cond. _____ 402
    10 _____ 424
    20 _____ 458
    Percent cond. at 450° F _____ 18
Viscosity:
    S. U. V. @ 100° F _____ 224
    S. U. V. @ 210° F _____ 46
Gardner-Holdt vis. (varnish series) _____ D–E
Flash, COC, °F _____ 205
Fire, COC, °F _____ 220
Pour point, °F _____ –20
Color (polymer method) _____ 5½
Percent nonvolatile _____ 67.5
Iodine number, WIJS _____ 202

In making the tests, two discrete compositions were compounded each consisting of a petroleum resin, a rosin and a solvent. The compositions were identical except that one contained a viscous resin (Phillips Drying Oil, Grade I), and the other contained a hard petroleum resin of the type coming within the scope of the instant invention (Velsicol AB 11–8). Identical amounts of materials were used in the two compositions, and in both instances the proportions were within the ranges specified for the instant invention (column 4). The tests were made according to the standard A. S. T. M. procedure described in columns 5–6 and the results appear in Tables V and VI below. Table V shows the results observed from three specimens of the composition made from a hard-type petroleum resin and Table VI shows the results observed from three specimens of the composition made from the normally viscous-type petroleum resin.

TABLE V

| Specimen No. | 6268 | | | 6269 | | | 6270 | | |
|---|---|---|---|---|---|---|---|---|---|
| | Wgt. | Loss in Grams | Loss in Per Cent | Wgt. | Loss in Grams | Loss in Per Cent | Wgt. | Loss in Grams | Loss in Per Cent |
| Weight at Molding | 564.5 | | | 562.9 | | | 564.8 | | |
| Weight of pan | 46.1 | | | 45.5 | | | 45.9 | | |
| Weight of Mortar | 518.4 | | | 517.4 | | | 518.9 | | |
| Water in Mortar | 49.7 | | | 50.2 | | | 49.8 | | |
| Wgt. before Brushing | 560.4 | | | 558.3 | | | 559.8 | | |
| Wgt. after Brushing | 559.9 | | | 557.3 | | | 559.0 | | |
| Wgt. before Sealing | 559.9 | | | 557.3 | | | 559.0 | | |
| Wgt. after Sealing | 569.3 | | | 567.5 | | | 569.3 | | |
| Wgt. at start cure | 568.1 | | | 566.1 | | | 568.2 | | |
| Water loss before cure | 5.3 | | | 5.6 | | | 6.1 | | |
| Wgt. of Curing Compound | 3.2 | | | 3.2 | | | 3.2 | | |
| Solids in Curing Comp. | 1.1 | | | 1.1 | | | 1.1 | | |
| Corrected Weight | 569.2 | | | 567.2 | | | 569.3 | | |
| 1 Day | 568.3 | 0.9 | 2.03 | 566.2 | 1.0 | 2.2 | 568.3 | 1.0 | 2.3 |
| 3 Days | 567.7 | 1.5 | 3.4 | 565.5 | 1.7 | 3.8 | 567.6 | 1.7 | 3.9 |
| 7 Days | 566.2 | 3.0 | 6.8 | 564.0 | 3.2 | 7.2 | 566.1 | 3.2 | 7.3 |

TABLE VI

| Specimen No. | 6265 | | | 6266 | | | 6267 | | |
|---|---|---|---|---|---|---|---|---|---|
| | Wgt. | Loss in Gms. | Loss in Per cent | Wgt. | Loss in Gms. | Loss in Per cent | Wgt. | Loss in Gms. | Loss in Per cent |
| Weight at Molding | 573.9 | | | 558.5 | | | 564.4 | | |
| Weight of pan | 49.3 | | | 45.2 | | | 44.1 | | |
| Weight of Mortar | 524.6 | | | 513.3 | | | 520.3 | | |
| Water in Mortar | 53.1 | | | 50.7 | | | 51.7 | | |
| Wgt. before Brushing | 569.7 | | | 553.7 | | | 561.0 | | |
| Wgt. after Brushing | 569.0 | | | 552.9 | | | 560.2 | | |
| Wgt. before Sealing | 569.0 | | | 552.9 | | | 560.2 | | |
| Wgt. after Sealing | 579.7 | | | 563.6 | | | 571.2 | | |
| Wgt at start cure | 578.8 | | | 563.2 | | | 570.0 | | |
| Water loss before cure | 5.1 | | | 5.1 | | | 5.2 | | |
| Wgt. of Curing Compound | 3.2 | | | 3.2 | | | 3.2 | | |
| Solids in Curing Comp. | 1.0 | | | 1.0 | | | 1.0 | | |
| Corrected Weight | 579.8 | | | 564.2 | | | 571.0 | | |
| 1 Day | 562.0 | 17.8 | 37 | 547.9 | 16.3 | 35.8 | 552.8 | 18.2 | 39.1 |
| 3 Days | 558.2 | 21.6 | 45 | 544.0 | 20.2 | 44.3 | 548.9 | 22.1 | 47.6 |
| 7 Days | 555.1 | 24.7 | 51.5 | 540.5 | 23.7 | 52.0 | 545.5 | 25.5 | 55.0 |

As suggested, 5 grams of water loss in seven days is considered the maximum allowable under the test. The fact that all three of the specimens listed in Table VI had lost at least 16.3 grams of water by the end of the first day indicates that the viscous petroleum resin used therein is entirely unsuited for use in a concrete curing compound and that it cannot be considered an equivalent of the hard petroleum resin used in the specimens listed in Table V. In contrast, the superlative qualities of the hard petroleum resin are conclusively established by the fact that none of the specimens listed in Table V lost more than 3.2 grams of water in seven days.

Having thus described my invention, what I claim by Letter Patent is:

1. A liquid composition for curing freshly placed concrete comprising from 28 to 46 parts of a material selected from the class consisting of coumarone-indene resin melting at approximately 100–120° C., terpene resin melting at approximately 100–120° C., and a methylated indene-methylated styrene resin which normally exists as a hard brittle mass and forms solutions of low viscosity, melting at approximately 100–120° C., and having a molecular weight in the range of 500–2000, said resin having been produced by the cracking and repolymerization of selected petroleum distillates; from 7 to 11 parts of a rosin material selected from the class consisting of rosin, calcium rosinate and zinc rosinate; and from 64 to 43 parts of a volatile hydrocarbon solvent.

2. A liquid composition for curing freshly placed concrete comprising from 28 to 46 parts of a methylated indene-methylated styrene resin which normally exists as a hard brittle mass and forms solutions of low viscosity, melting at approximately 100–120° C., and having a molecular weight in the range of 500–2000, said resin having been produced by the cracking and repolymerization of selected petroleum distillates; from 7 to 11 parts of a rosin material selected from the class consisting of rosin, calcium rosinate and zinc rosinate; and from 64 to 43 parts of a volatile hydrocarbon solvent.

3. A liquid composition for curing freshly placed concrete comprising from 28 to 46 parts of coumarone-indene resin melting at approximately 100–120° C.; from 7 to 11 parts of a rosin material selected from the class consisting of rosin, calcium rosinate and zinc rosinate; and from 64 to 43 parts of a volatile hydrocarbon solvent.

4. A liquid composition for curing freshly placed concrete comprising from 28 to 46 parts of terpene resin melting at approximately 100–120° C.; from 7 to 11 parts of a rosin material selected from the class consisting of rosin, calcium rosinate and zinc rosinate; and from 64 to 43 parts of a volatile hydrocarbon solvent.

5. The method of treating freshly placed concrete to inhibit evaporation of moisture which consists of coating the surface of the concrete with a substance comprising from 28 to 46 parts of a material selected from the class consisting of coumarone-indene resin melting at approximately 100-120° C.; terpene resin melting at approximately 100-120° C.; and a methylated indene-methylated styrene resin which normally exists as a hard brittle mass and forms solutions of low viscosity, melting at approximately 100-120° C., and having a molecular weight in the range of 500-2000, said resin having been produced by the cracking and repolymerization of selected petroleum distillates; from 7 to 11 parts of a rosin material selected from the class consisting of rosin, calcium rosinate and zinc rosinate; and from 65 to 43 parts of a volatile hydrocarbon solvent.

RALPH E. MADISON.

REFERENCES CITED

The following references are of record in the file of this patent:

UNITED STATES PATENTS

| Number | Name | Date |
|---|---|---|
| 2,223,086 | Williams | Nov. 26, 1940 |

Certificate of Correction

Patent No. 2,441,826.  May 18, 1948.

RALPH E. MADISON

It is hereby certified that error appears in the printed specification of the above numbered patent requiring correction as follows: Columns 5 and 6, Table 1, item number 5, under the subheading "Pounds Resin" insert the numeral *32*; and that the said Letters Patent should be read with this correction therein that the same may conform to the record of the case in the Patent Office.

Signed and sealed this 20th day of July, A. D. 1948.

[SEAL]

THOMAS F. MURPHY,
*Assistant Commissioner of Patents.* of a material selected from the class consisting of coumarone-indene resin melting at approximately 100-120° C.; terpene resin melting at approximately 100-120° C.; and a methylated indene-methylated styrene resin which normally exists as a hard brittle mass and forms solutions of low viscosity, melting at approximately 100-120° C., and having a molecular weight in the range of 500-2000, said resin having been produced by the cracking and repolymerization of selected petroleum distillates; from 7 to 11 parts of a rosin material selected from the class consisting of rosin, calcium rosinate and zinc rosinate; and from 65 to 43 parts of a volatile hydrocarbon solvent.

RALPH E. MADISON.

REFERENCES CITED

The following references are of record in the file of this patent:

UNITED STATES PATENTS

| Number | Name | Date |
|---|---|---|
| 2,223,086 | Williams | Nov. 26, 1940 |

Certificate of Correction

Patent No. 2,441,826.                                                         May 18, 1948.

RALPH E. MADISON

It is hereby certified that error appears in the printed specification of the above numbered patent requiring correction as follows: Columns 5 and 6, Table 1, item number 5, under the subheading "Pounds Resin" insert the numeral *32*; and that the said Letters Patent should be read with this correction therein that the same may conform to the record of the case in the Patent Office.

Signed and sealed this 20th day of July, A. D. 1948.

[SEAL]

THOMAS F. MURPHY,
*Assistant Commissioner of Patents.*